(12) United States Patent
Stempky

(10) Patent No.: US 9,244,091 B1
(45) Date of Patent: Jan. 26, 2016

(54) PROTECTIVE HEADPIECE INCLUDING AN IMPACT SENSOR AND AN IMPACT ANNUNCIATION DEVICE

(71) Applicant: Gregory Stempky, Spring Lake, MI (US)

(72) Inventor: Gregory Stempky, Spring Lake, MI (US)

( * ) Notice: Subject to any disclaimer, the term of this patent is extended or adjusted under 35 U.S.C. 154(b) by 0 days.

(21) Appl. No.: 14/701,506

(22) Filed: Apr. 30, 2015

Related U.S. Application Data

(60) Provisional application No. 62/138,957, filed on Mar. 26, 2015.

(51) Int. Cl.
*G01M 7/00* (2006.01)
*G01P 15/00* (2006.01)
*A42B 3/04* (2006.01)
*G01L 5/00* (2006.01)
*A63B 71/06* (2006.01)

(52) U.S. Cl.
CPC .............. *G01P 15/001* (2013.01); *A42B 3/046* (2013.01); *A63B 71/0619* (2013.01); *G01L 5/0052* (2013.01)

(58) Field of Classification Search
CPC ....... A42B 3/046; G01L 5/0052; G01P 1/127; G01P 15/001; G02L 5/0052
USPC ......................... 73/12.01, 12.04, 12.09, 12.03
See application file for complete search history.

(56) References Cited

U.S. PATENT DOCUMENTS

| | | | |
|---|---|---|---|
| 8,556,831 B1* | 10/2013 | Faber | A42B 3/046 340/500 |
| 8,896,457 B2* | 11/2014 | Howard | G08B 13/1427 2/425 |
| 2006/0074338 A1* | 4/2006 | Greenwald | A61B 5/0002 600/549 |
| 2012/0077440 A1* | 3/2012 | Howard | G08B 13/1427 455/41.2 |
| 2012/0143526 A1* | 6/2012 | Benzel | A42B 3/046 702/42 |
| 2013/0060489 A1* | 3/2013 | Crossman | G01L 5/0052 702/41 |
| 2015/0245680 A1* | 9/2015 | Partlo | A42B 3/0473 2/411 |

* cited by examiner

*Primary Examiner* — Max Noori
(74) *Attorney, Agent, or Firm* — James E. Shultz, Jr.

(57) ABSTRACT

Impact at a protective headpiece, for example a protective headpiece, may be characterized in part using an impact sensor including at least one acceleration sensor positioned on the protective headpiece. A microcontroller may be configured to identify and store acceleration sensor data based on the output values of the at least one acceleration sensor. A processor device receives the acceleration and/or deceleration data, and may determine whether the experienced impact force is associated with an impact force magnitude that is within a predetermined head injury range of magnitude. An impact alert may be generated when the impact force magnitude is within the predetermined head injury range of magnitude, wherein a predetermined head injury range of magnitude may be adjustable between a practice setting and a game setting, and wherein the impact alert may be visible to an individual wearing the protective headpiece. An electronic device (e.g., a light emitting diode or light emitting diodes) may display a severity indication and an identifier of a person associated with the sensor that experienced impact.

20 Claims, 9 Drawing Sheets

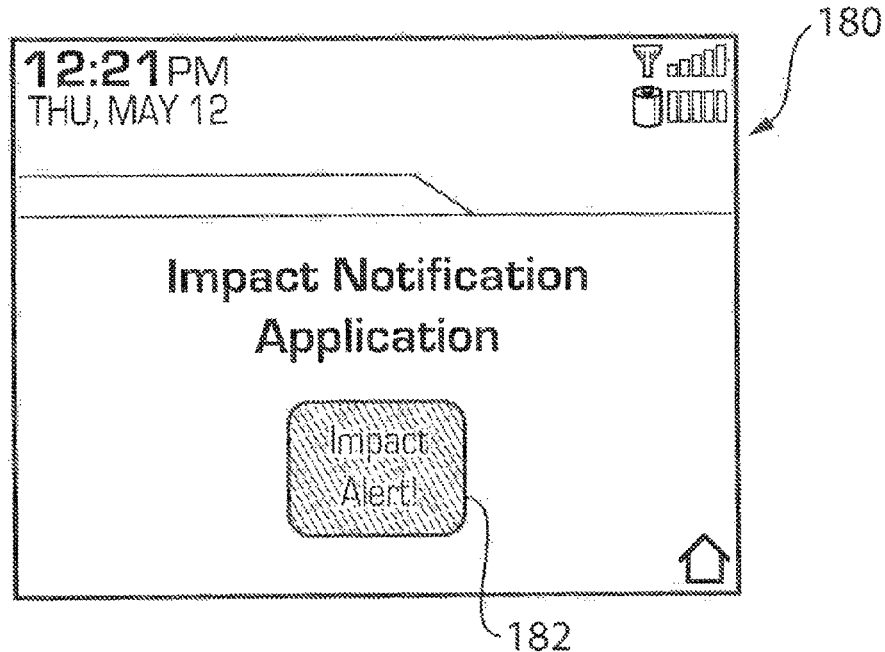
(PRIOR ART) FIG. 4A
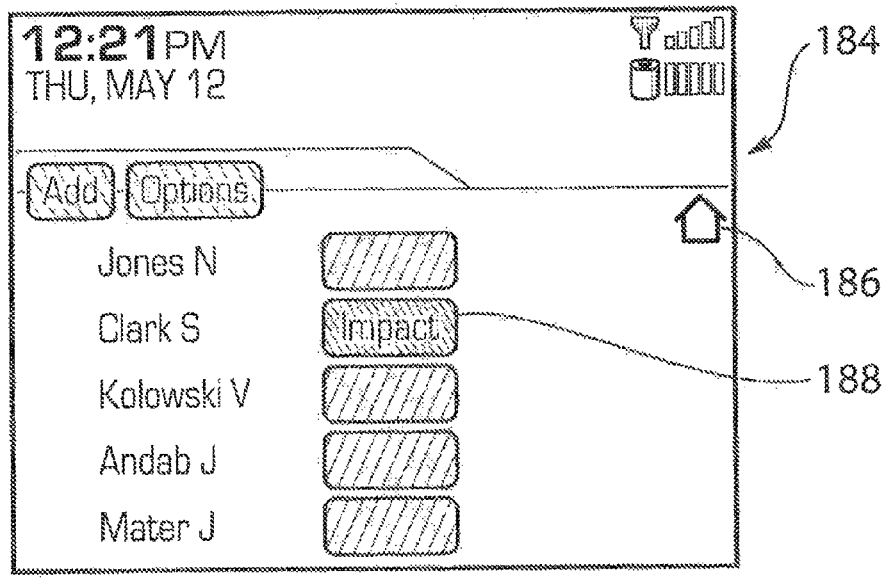
(PRIOR ART) FIG. 4B

PROTECTIVE HEADPIECE INCLUDING AN IMPACT SENSOR AND AN IMPACT ANNUNCIATION DEVICE

CROSS REFERENCE TO RELATED APPLICATION

This application claims the benefit of priority under 35 USC 119(e) to U.S. Provisional Patent Application Ser. No. 62/138,957, filed Mar. 26, 2015, entitled PROTECTIVE HEADPIECE INCLUDING AN IMPACT SENSOR AND AN IMPACT ANNUNCIATION DEVICE, the entire disclosure of which is incorporated herein by reference.

TECHNICAL FIELD

The present disclosure relates to a protective headpiece, including but not limited to a protective headpiece. More particularly, the present disclosure relates to a protective headpiece that includes an impact sensing and an impact annunciation device.

BACKGROUND

A protective headpiece is a device worn on the head as an ornament or to serve a function. A protective headpiece, or headwear, refers to any type of helmet, hat, head band, mask, toque, cap, or other item, device or garment worn on the head, for the purposes of protection, fashion or any other function or combination of functions.

Protective headpieces provide protection from external forces in workplaces or recreational environments. For example, protective headpieces are used by firefighters and other emergency service workers, construction workers, tradesmen, professional and amateur athletes, as well as by children participating in sports and recreational activities. Some participants in sports or recreational activities choose to wear a protective headpiece, such as a ski or snowboard hat, that is designed primarily for fashion or protection from cold weather, rather than protection from external forces, such as impact forces.

A sports headpiece protects the wearer from injury by absorbing force in situations involving impact. However, particularly in sports such as hockey, football, and lacrosse, concussions and head injuries are still a concern even when players wear protective headpieces.

It is important to be able to identify situations in which a person should seek medical attention, particularly if expert advice is not available at the time.

Some prior approaches use one or more accelerometers to measure acceleration and/or deceleration of a sports headpiece due to an impact force. Based on computation of the complex acceleration and/or deceleration data gathered by the accelerometer, a determination can be made regarding the degree of the impact.

Improvements in the characterization of impact sensed at a protective headpiece, such as a protective headpiece, are desirable, wherein the predetermined head injury range of magnitude is adjustable between a practice setting and a game setting, and wherein the impact alert is visible to an individual wearing the protective headpiece.

BRIEF DESCRIPTION OF THE DRAWINGS

Embodiments of the present disclosure will now be described, by way of example only, with reference to the attached figures.

FIGS. 4A-4G illustrate screenshots of example visual impact alerts on a display of a portable electronic device, with elements of the screenshots being generated by an impact notification application according to an example embodiment;

DETAILED DESCRIPTION

Figure 1:
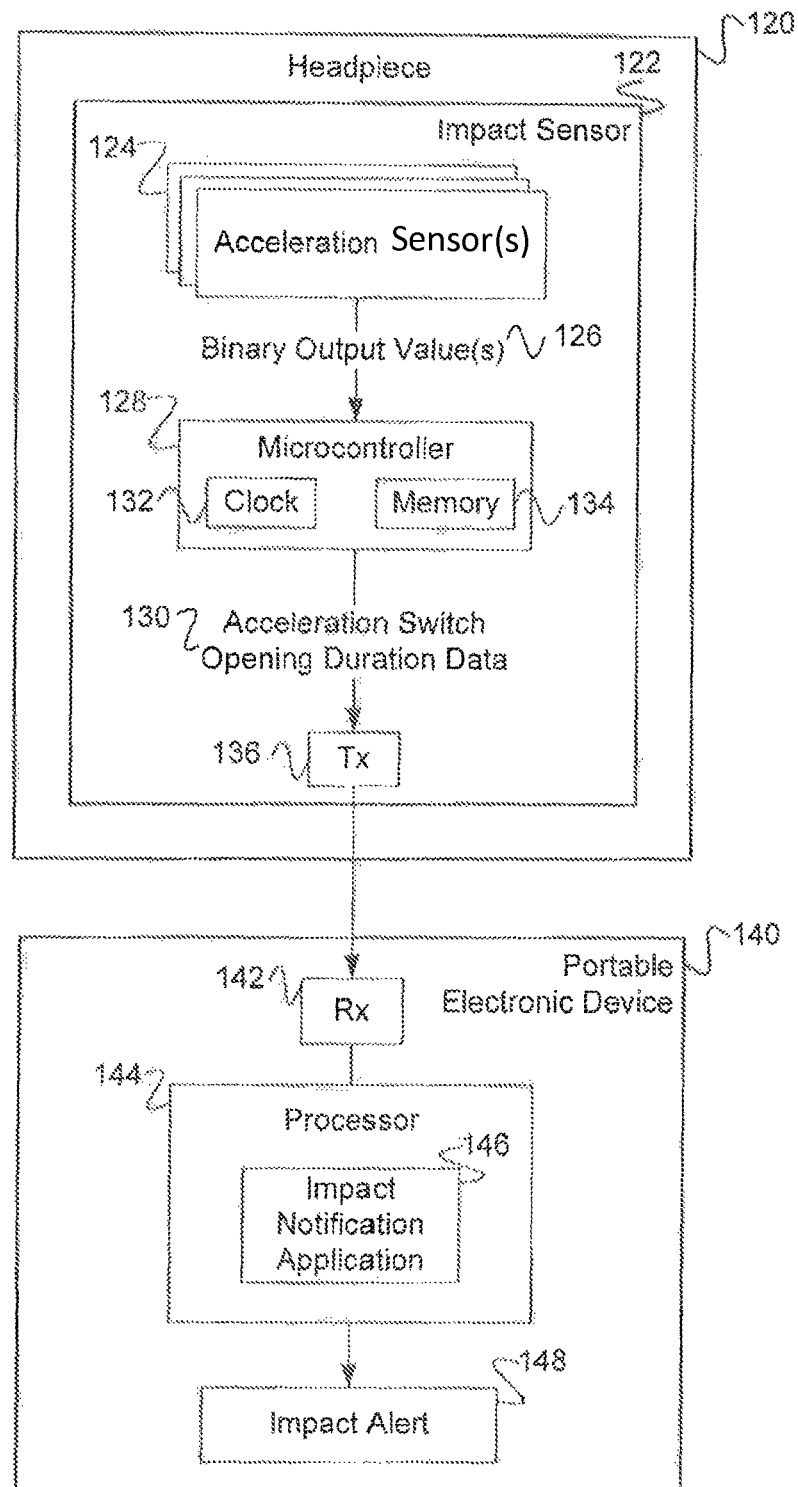
FIG. 1 is a block diagram of an example system for characterizing impact at a protective headpiece.

Impact at a protective headpiece, for example a protective helmet, may be characterized in part using an impact sensor (e.g., an accelerometer), or sensors (e.g., a plurality of accelerometers) including at positioned on the protective headpiece. A microcontroller may be configured to identify and store acceleration sensor data (e.g., acceleration and/or deceleration values) based on the output values of the at least one acceleration sensor. A processor at a portable electronic device receives the acceleration sensor data and determines whether the experienced impact force is associated with an impact force magnitude that is within a predetermined head injury range of magnitude. An impact alert is generated when the impact force magnitude is within the predetermined head injury range of magnitude. In an embodiment, the portable electronic device displays a severity indication and an identifier of a person associated with the sensor that experienced impact.

Acceleration sensor(s) in a protective headpiece (e.g., helmet) may trigger a signaling device on the headpiece, such as LED lights on the headpiece, or in the facemask. At a preset force, the lights may be triggered. For example, a lower force for younger kids, and a set point threshold may be higher as kids got older (and/or bigger).

Two adjustable signals (or thresholds) may be provided in a protective headpiece that may signal the wearer of the headpiece, as well as trainers, coaches, and officials at different preset determinations. For example, referees may have a hand held device (e.g., portable electronic device 140 of FIG. 1) that could check to make sure the thresholds are set correctly. When an impact indicating light is activated, for example, a first time during a game, an associated player may have to come out for one play. If the impact indicator light (e.g., alert indicator 212 of FIG. 6) goes off again (a different color signal), the player may be out for four plays. If the impact indicator is activated one more time, the play may be out for a current game. With younger kids, this may be automatic to protect them from concussions. In the higher leagues College, Professional and perhaps high school, it could be the call of the referee on how much time the player would have to sit out when an impact indicator is activated. The ultimate decision may, for example, be based on whether the player was an instigator (used his head to tackle or spear) or whether the impact was unintentional (e.g., headpiece hit an arm, turf, etc. . . . ). Regardless, anytime the impact indicator light is activated, the player may need to be checked out.

During practice, an impact signaling device may be set at a lower threshold level, so players may learn what type circumstances activate the impact signaling device. Thereby, the players may learn proper ways to tackle (e.g., not to lead with their heads). The players may learn to carry the ball without putting their head down. If players know that if their signaling device goes off (headpiece lights up), that they have to sit out a play, they may adjust their style to prevent that from happening. Younger kids all the way to professionals may learn proper techniques with instant feedback if they have a wrong technique. If the impact indicator light is activated, the player may need to get checked out before they are allowed to reenter a practice or a game. Coaches may set a threshold level lower during practice to prevent injury and teach proper techniques. Variations, may be used in Lacrosse and Hockey.

Impact sensors on protective headgear may trigger an indicator such as an LED or other Indicator to light up/signal that is visible to an individual wearing the protective headgear. The force that would be required to trigger the signal/indicator may be adjusted via a handheld device (or app for a smart phone). If the headpiece (sensor) were impacted with a preset force, the sensor may trigger a signaling device (such as an LED light). The signaling device may be readily apparent to the wearer to give instant feedback and also readily apparent to anyone observing. The hand held device may also be able to reset the indicator through an encrypted signal. There may be different settings that would allow for many indicators/headgear to be reset at once. Another setting may allow the impact indicator to be reset from only a few handheld devices.

An acceleration sensor may be a switch that outputs an indication of whether a prescribed acceleration threshold and/or deceleration threshold has been exceeded. The acceleration sensor may output an on/off signal. Alternatively, or additionally, an accelerometer or acceleration sensor may determine, and output, a variable signal related to the experienced acceleration and/or deceleration value, regardless of the value. Typically, the output value of an acceleration sensor may be used to trigger or drive an indicator to which the sensor is directly connected. The output of the acceleration sensor may not be stored or collected, or the output may be store or collected.

In an embodiment, a processor-implemented method of characterizing protective headpiece impact includes the following steps: receiving acceleration sensor data based on output values from at least one acceleration sensor, the at least one acceleration sensor positioned on the protective headpiece to detect acceleration and/or deceleration of the protective headpiece due to an impact force that exceeds a prescribed acceleration threshold and/or deceleration threshold, the detected acceleration and/or deceleration being along more than one axis, the output values observed during a period of time including the impact; determining, based on the received acceleration sensor data, whether the impact force is associated with an impact force magnitude that is within a predetermined head injury range of magnitude; and outputting an impact alert when the impact force magnitude is within the predetermined head injury range of magnitude.

In an example embodiment, the acceleration sensor data comprises a plurality of acceleration sensor opening durations, a longest acceleration sensor observed during the period of time including the impact, or a number of activations of the at least one acceleration sensor observed during the period of time including the impact. In an example embodiment, a direction of the impact is determined by identifying an axis on which the longest acceleration and/or deceleration is observed.

In an example embodiment, the method further comprises calculating a value of the impact force magnitude, or a range of magnitude of the impact force, based on the received acceleration sensor data. The method can further include providing an indication of the calculated range of magnitude of the impact force based on stored magnitude range category thresholds. The indication can comprise a visual indication identifying an impact severity associated with the calculated range of magnitude of the impact force, and the visual indication can include a personal identifier identifying a person associated with an impact sensor at which the impact force is measured.

In an example embodiment, the method further comprises providing an impact notification in response to receiving a requester signal, and before a complete packet of acceleration sensor data is received. The impact notification indicates generally that the impact exceeds a prescribed threshold independent of, and without providing information regarding, the impact force magnitude.

In an example embodiment, determining whether the impact force is associated with an impact force magnitude that is within a predetermined head injury range of magnitude is based on stored rules associating acceleration sensor data with impact force magnitudes.

In another example embodiment, determining whether the impact force is associated with an impact force magnitude that is within a predetermined head injury range of magnitude comprises: determining whether the acceleration sensor data is between a minimum and maximum acceleration and/or deceleration associated with a predetermined head injury range of magnitude.

In a further example embodiment, determining whether the impact force is associated with an impact force magnitude that is within a predetermined head injury range of magnitude comprises: comparing the acceleration sensor data to test data to identify a best match within the test data; and correlating the best match with stored head acceleration and/or deceleration impact data, and outputting the impact alert when the correlated head acceleration and/or deceleration impact data is within a predetermined head injury range of magnitude.

In an embodiment, a non-transitory machine-readable memory is provided storing statements and instructions for execution by a processor to perform a processor-implemented method of characterizing a protective headpiece impact, comprising: receiving acceleration sensor data based on output values from at least one acceleration sensor, the at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis, the output values observed during a period of time including the impact; determining, based on the received acceleration sensor data, whether the impact force is associated with an impact force magnitude that is within a predetermined head injury range of magnitude; and outputting an impact alert when the impact force magnitude is within the predetermined head injury range of magnitude.

In another embodiment, a microcontroller-implemented method of characterizing impact at a protective headpiece, comprises: obtaining output values from at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis, the output values observed during a period of time including the impact; identifying acceleration sensor data based on the output values of at least one acceleration sensor; and providing the acceleration sensor data to a receiver for impact characterization. The microcontroller-implemented method can further include providing an impact alert when a selected received acceleration sensor described by the acceleration sensor data is associated with an impact force magnitude that falls within a known head injury range of magnitude.

In an embodiment, an impact sensor arranged for use with a protective headpiece for characterizing impact is provided, comprising at least one acceleration sensor, a microcontroller and a transmitter. The at least one acceleration sensor is positioned on the protective headpiece to detect acceleration and/or deceleration of the protective headpiece due to an impact force that exceeds a prescribed acceleration and/or deceleration threshold, the detected acceleration and/or deceleration being along more than one axis. The microcontroller is in communication with the at least one acceleration sensor to obtain output values therefrom. The microcontroller is configured to identify and store acceleration sensor data based on the output values of at least one acceleration sensor. The transmitter is in communication with the microcontroller, and is configured to provide the acceleration sensor data to a receiver for impact characterization. The impact sensor can further include an alert indicator configured to provide an impact alert when a selected received acceleration sensor described by the acceleration sensor data is associated with an impact force magnitude that falls within a known head injury range of magnitude.

In another embodiment, a protective headpiece is provided, including an impact sensor as described herein, the impact sensor being integral with, or attached to, a surface of the protective headpiece. In an embodiment, the alert indicator is provided on, or visible from, an exterior surface of the protective headpiece, for example the outer surface of a protective headpiece.

In another embodiment, a non-transitory machine-readable memory is provided storing statements and instructions for execution by a microcontroller to perform a microcontroller-implemented method of characterizing a protective headpiece impact, comprising: obtaining output values from at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis, the output values obtained during a period of time including the impact; identifying acceleration sensor data based on the output values of at least one acceleration sensor; and providing the acceleration sensor data to a receiver for impact characterization.

In a further embodiment, a microcontroller-implemented and processor-implemented method of characterizing protective headpiece impact is provided, comprising: obtaining output values from at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis; identifying and storing acceleration sensor data based on the output values of at least one acceleration sensor; determining, based on the stored acceleration sensor data, whether the impact force is associated with an impact force magnitude that is within a predetermined head injury range of magnitude; and outputting an impact alert when the impact force magnitude is within the predetermined head injury range of magnitude.

In another embodiment, a system for characterizing impact at a protective headpiece is provided, comprising an impact sensor and a portable electronic device as described herein. The impact sensor is arranged for use with the protective headpiece and includes: at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis; a microcontroller, in communication with the at least one acceleration sensor to obtain output values therefrom, the microcontroller configured to identify and store acceleration sensor data based on the output values of at least one acceleration sensor; and a transmitter, in communication with the microcontroller, configured to provide the acceleration sensor data to a receiver for impact characterization. The portable electronic device is in communication with the impact sensor, and includes: a receiver in communication with the transmitter of the impact sensor; and a processor storing statements and instructions which, when executed, cause the processor to implement a method of characterizing protective headpiece impact. The method performed by the processor includes: receiving acceleration sensor data based on output values collected during a period of time including the impact from at least one acceleration sensor, the at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis; and determining, based on the received acceleration sensor data, whether the impact force is associated with an impact force magnitude that is within a predetermined head injury range of magnitude. The system further includes an alert indicator in communication with the processor, configured to output an impact alert when the impact force magnitude is within the predetermined head injury range of magnitude.

FIG. 1 is a block diagram of an example of a system for characterizing impact at a protective headpiece in accordance with an example embodiment, including an impact sensor and an impact notification application. Methods in accordance with other example embodiments are performed in relation to, or by, the illustrated sensor, microcontroller and processor on the portable electronic device.

Impact Sensor Observing Sensor

In FIG. 1, an impact sensor 122 including at least one acceleration sensor 124 is positioned on a protective headpiece 120, such as a protective headpiece, to detect acceleration and/or deceleration of the protective headpiece due to an impact force that exceeds a prescribed acceleration and/or deceleration threshold for the acceleration sensor. The impact sensor 122 also comprises a power source, such as a battery (not shown), and other elements.

In contrast to the prior approaches, embodiments of the present disclosure use at least one inexpensive acceleration sensor 124 as part of an impact sensor 122, instead of one or more accelerometers. Accelerometers demand elaborate signal processing and continuous power supply, since they are always gathering data. Accelerometers are also expensive, with the expense increasing when the accelerometer is to detect forces of up to 500 G at a high sampling rate, as in situations in which embodiments of the present disclosure can be used. An acceleration sensor 124 is a mechanical switch that is closed by default, and opens once a threshold acceleration and/or deceleration value is exceeded. The acceleration sensor does not compute or store acceleration and/or deceleration values, but simply operates in a function (on/off). In an example implementation, the acceleration sensor 124 opens if it is subject to an acceleration and/or deceleration of at least about 170 G.+−0.2 G.

For example, the acceleration sensor 124 outputs a value of "1" when the acceleration and/or deceleration threshold is exceeded and the switch is open. The switch 124 outputs a value of "0" when the experienced acceleration and/or deceleration does not exceed the threshold and the switch is, or remains, closed. In an embodiment, the prescribed acceleration and/or deceleration threshold is fixed for the acceleration sensor, and properties of the switch are tuned or selected to achieve the prescribed acceleration and/or deceleration threshold. Different acceleration sensor can be designed to have different acceleration and/or deceleration thresholds, for example for use on different axes.

In many cases, the detected acceleration and/or deceleration is along more than one axis, whether the impact sensor includes one omnidirectional acceleration sensor, a plurality of bidirectional acceleration sensor, or any other suitable configuration having at least one acceleration sensor. In an embodiment, the at least one acceleration sensor 124 is configured to detect axial acceleration and/or deceleration.

For example, an impact sensor 122 used for sports applications can include 3 sensor, or sensor elements, for measuring or detecting triaxial displacement. In another example, a more advanced sensor can include 6 acceleration sensor, or sensor elements, for measuring rotational displacement. In an example embodiment, the impact sensor 122 includes five acceleration sensor 124 mounted in three axes (x1, x2, y1, y2, z), with each acceleration sensor 124 having a different "set-off" acceleration and/or deceleration value, or prescribed acceleration and/or deceleration threshold, above which it will remain open, to provide for detection of desired head injury thresholds.

In an example embodiment, the at least one acceleration sensor 124 comprises a ball and spring configuration, which operates based on set-back forces. An example of such a ball and spring-type sensor element is found in U.S. Pat. No. 5,539,935, which is incorporated herein by reference in its entirety. When an impact force is applied to the acceleration sensor, it sets back the ball mass against the spring, and opens the contact for the duration of the impact force. However, the basic approach in the '935 patent is not very accurate, and does not have sufficient resolution to properly characterize the impact as in embodiments of the present disclosure, for example by correlating headpiece impact data with head impact data. In contrast, embodiments of the present disclosure perform analysis on the axes, the analysis being directional, since on-axis hits and off-axis hits signal on both axes. Embodiments of the present disclosure analyze the direction as well as the magnitude of the impact, and the timings, and calculate impact magnitude based on switch opening duration.

Each of the at least one acceleration sensors 124 has a prescribed acceleration and/or deceleration threshold set at a certain level, for example 100 G, 170 G, 225 G. The determination of the value of the thresholds can be based on testing, which correlates the amount of force required in each axis. In an example embodiment, such values are: 225 G in Z, 170 G for front, 60 G for sides, and 225 G for the rear. The acceleration sensors 124 can be custom designed based on these determined specifications.

The at least one acceleration sensor 124 provides a (on/off) output value 126. Typically, this output value 126 is used as a trigger, and its output is not stored or analyzed.

In an embodiment of the present disclosure, a microcontroller 128 receives the output values 126 and identifies acceleration sensor data 130 based on the received output values 126. In contrast to a processor, which modifies data or changes its state, the microcontroller 128 organizes and sequences received data, but does not perform processing.

In the example embodiment in FIG. 1, the microcontroller 128 comprises a clock 132 and a memory 134, for example a flash memory. In another embodiment, the microcontroller 128 is in communication with the clock 132 and memory 134, one or both of which are provided external to the microcontroller 128. The microcontroller 128 observes or checks the output of the at least one acceleration sensor 124, for example the output values 126, at various times in relation to the clock 132. For example, intervals between observed times t0 and t1, and subsequent time intervals, can be one cycle of the clock 132.

Acceleration sensor is the duration, or amount of time, that an acceleration sensor remains open. The sensor is neither determined at, nor output by, the acceleration sensor 124. In an example embodiment, the acceleration sensor is observed by the microcontroller 128.

Acceleration sensor data 130 is data related to the acceleration sensor opening duration. An acceleration and/or deceleration event refers to the opening of an acceleration sensor, and includes the duration from the time the switch opens until it closes. In an embodiment, the acceleration and/or deceleration event includes the sequence of any state other than the switch being closed for a threshold number of consecutive clock cycles. Examples of acceleration sensor data that can be determined, during a time period including an impact, include one or more of the following, for each acceleration sensor: start time of opening or activation; end time of opening or activation; number of individual openings or activations, also referred to as toggles; longest duration; start time of impact; and end time of impact.

Consider the illustrative example data provided in Table 1 below. In an embodiment, the output values 126 in Table 1 are observed in relation to at least one acceleration sensor 124. In an example embodiment, in which a plurality of acceleration sensor 124 are provided, the output values 126 in Table 1 are observed in relation to one of the plurality of acceleration sensor 124 sensing acceleration and/or deceleration in a particular axis. In an embodiment, the period of time in relation to which the microcontroller 128 organizes and sequences the output values 126 includes the time of occurrence of the impact being characterized.

TABLE 1

| Binary Output Value | | | | | | | | | |
|---|---|---|---|---|---|---|---|---|---|
| 0 | 1 | 1 | 0 | 1 | 1 | 1 | 1 | 0 | 0 |
| Time t0 | t1 | t2 | t3 | t4 | t5 | t6 | t7 | t8 | T9 |

In relation to the example data in Table 1, the microcontroller 128 turns on at time t1 in response to activation of the at least one acceleration sensor 124, which indicates that the switch is open. The microcontroller 128 observes a state change at time t3, indicating that the switch is closed, and determines that a toggle has ended. The microcontroller 128 stores that information in the memory 134 as the longest switch opening so far, and continues to observe the output values 126.

At time t4, the switch opens and remains open until time t7. Since this second observed sensor is longer than the first switch opening duration, the microcontroller 128 stores the second sensor as the longest sensor so far. The microcontroller 128 can also record the number of toggles, even in the absence of stored data regarding when the toggles occurred.

Therefore, in this example, the microcontroller 128 records the event start time, event end time, longest opening in the event, and number of toggles in the event. In an embodiment, this collection of data is referred to as the acceleration sensor data 130. The microcontroller 128 stores the data, but does not process the data. The actions of the microcontroller 128 are similar in nature to those of a remote garage door opener, observing, recording and comparing data, without performing calculation. In an example embodiment, the microcontroller 128 comprises firmware to perform the steps described herein.

In an example embodiment, the microcontroller 128 implements the following method: gathering output values 126 from the at least one acceleration sensor 124; and identifying the longest acceleration sensor opening duration. In an embodiment, the longest acceleration sensor is used to determine the direction of the hit/impact, based on the fact that the closer the impact is to the axis of one of the sensors, the longer the switch will be open for, even if the difference is about 0.1 ms. A data library stored in memory can include impact numbers correlating known headpiece acceleration and/or deceleration with head acceleration and/or deceleration.

In an example embodiment, the microcontroller 128 in the impact sensor 122 samples the output values 126 at any fixed frequency. In an embodiment, the sampling frequency is in the range of about 85 kHz to about 125 kHz, so as not to miss portions of the early part of an impact trace. In an example embodiment, the sampling frequency is about 100 kHz.

The acceleration sensor data 130 is associated with the at least one acceleration sensor 124. In an example embodiment, the acceleration sensor data 130 is observed by the microcontroller 128 based on the output values 126. The sensor data 130 can include one or more acceleration sensor opening durations, for example one in each axis in which impact has occurred.

Generating Impact Alert Based on Sensor Data

In the example embodiment of FIG. 1, the impact sensor 122 includes a transmitter 136, for example a wireless transmitter, configured to transmit a signal to a portable electronic device 140 to display an impact alert 148. In an embodiment, the transmitter 136 is configured to transmit data according to any suitable protocol, such as WiFi, Zigbee, Bluetooth, etc. In an embodiment, the wireless transmitter 136 is an RF transmitter. In another embodiment, the wireless transmitter 136 is a Bluetooth transmitter, such as a Class 1 Bluetooth transmitter, or other near field communication technology.

The portable electronic device 140 can be any device capable of receiving data, such as a laptop computer, tablet computer, smart phone, mobile phone, media player, data enabled clothing or other equipment with an embedded receiver. The portable electronic device 140 can run using any suitable operating system, such as Blackberry OS, Android, Windows Mobile, iOS, etc.

The portable electronic device 140 includes a receiver 142, for example a wireless receiver, configured to receive data from the wireless transmitter 136. In an example embodiment, the received data is the acceleration sensor data 130.

In an example embodiment, the receiver 142 comprises a receiver that is native to the portable electronic device 140, such as one or more of an RF receiver, Bluetooth receiver, Wi-Fi receiver, or other near field communication technology. In an embodiment, in which the transmitter 136 comprises a Bluetooth transmitter, the receiver 142 comprises a Bluetooth receiver, in which case the portable electronic device 140 can be "paired" with the impact sensor 122, in a manner known to those of ordinary skill in the art.

The portable electronic device 140 includes a processor 144, which can include an internal memory. The processor 144 processes the acceleration sensor data 130 received by the wireless receiver 142 and outputs an impact alert 148 under certain conditions. The acceleration sensor data 130 can be stored in the processor's memory, or in any other memory to which the processor has access and necessary read/write access rights. The processor 144 can be a processor native to the portable electronic device 140.

In an embodiment, the processor 144 runs an application, such as an impact notification application 146, configured to output an appropriate impact alert 148 based on the received acceleration sensor data 130. In an embodiment, the impact notification application 146 is configured to interpret received acceleration sensor data 130 and to generate an impact alert 148 based on such interpretation. The impact notification application 146 can be implemented in any suitable programming language, such as Java.

In an embodiment, the impact notification application provides an impact alert 148 as a visual indication on a display of the portable electronic device 140. In an embodiment, the impact sensor 122 shown in FIG. 1 communicates with the portable electronic device 140, and an impact alert 148 is displayed or generated whether a full packet of data has been successfully received or not.

In an embodiment, the impact alert 148 comprises an impact notification, or impact alert trigger, notifying of the existence of an impact for a given impact sensor/player, without providing additional data. An impact notification can be generated in the absence of complete acceleration sensor data, as long as sufficient data is available to determine that an impact alert of some sort is to be generated.

After the data is received and interpreted by the impact notification application 146, alert details can be displayed. In an example embodiment, the impact alert 148 comprises a detailed impact message, including characteristics of the impact. In an example embodiment, a visual impact alert comprising a detailed impact message displayed on a display can comprise an identification of the player by number, name, or both, and an indication of the severity of the impact.

In another embodiment, the impact notification application 146 provides the impact alert 148 as an audible indication via a speaker or audio output port, or both, of the portable electronic device 140. In a further embodiment, the application 146 provides a tactile alert, such as a vibration of the portable electronic device 140.

Categories of impact severity, degree or magnitude, can be communicated by varying any characteristic of the output, such as a different colour, sound, volume level, or vibration intensity, corresponding to different impact severity categories. In an example embodiment, the visual, audible, or tactile impact alert indications can be provided alone, or one or more of the indications can be provided together. Other types of alerts or indications are known to those of ordinary skill in the art.

In an embodiment, the processor 144 outputs an impact alert 148 when a selected received acceleration sensor described by the acceleration sensor data is associated with a stored or predetermined head injury range of magnitude.

Figure 2:
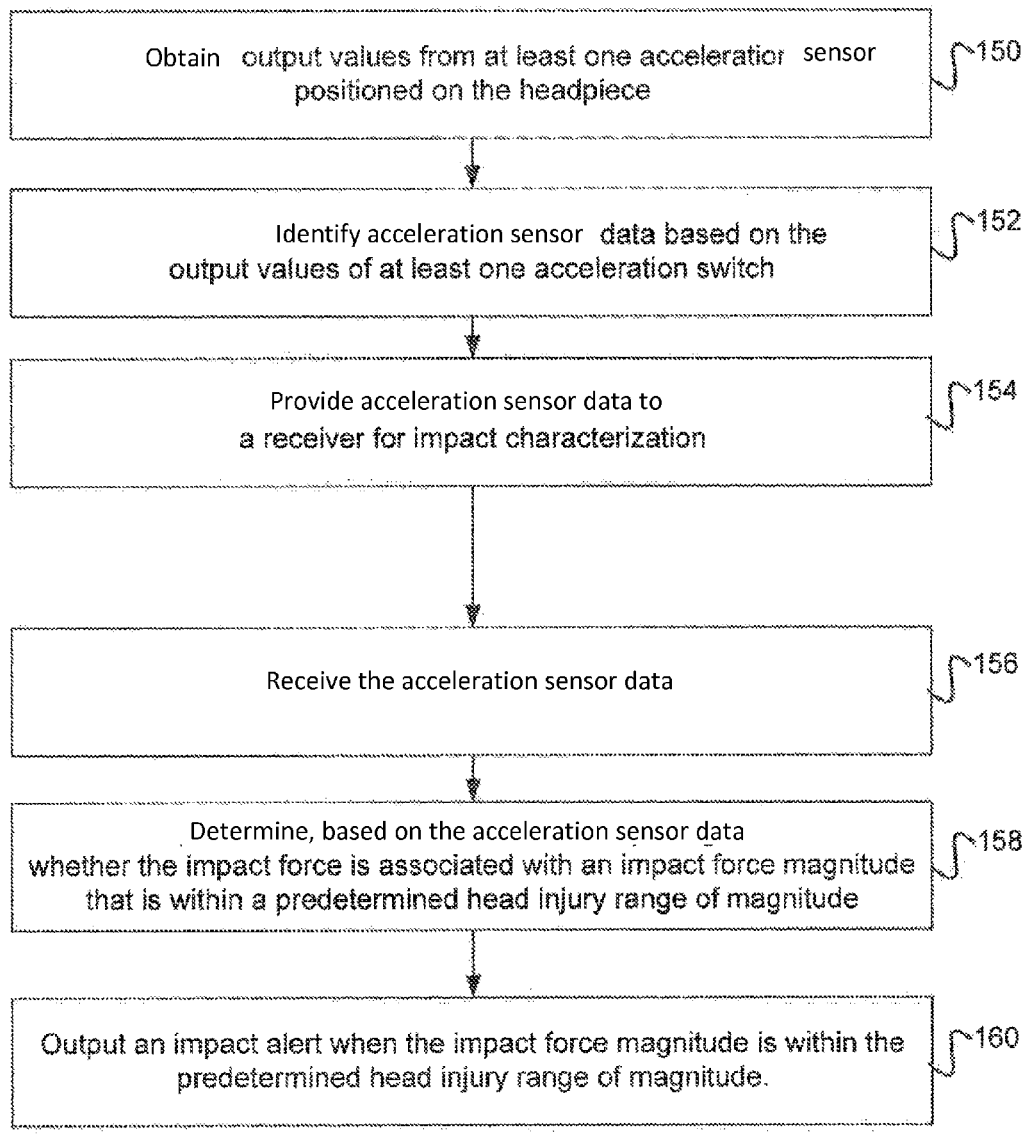
FIG. 2 is a flowchart illustrating an example method of characterizing impact at a protective headpiece.

FIG. 2 is a flowchart illustrating a method of characterizing impact at a protective headpiece in accordance with an example embodiment.

In an embodiment, method steps 150-152 are performed by the microcontroller 128 of the impact sensor 122. In step 150, output values are obtained from at least one acceleration sensor, which is positioned on the protective headpiece to detect acceleration and/or deceleration of the protective headpiece due to an impact force that exceeds a prescribed acceleration and/or deceleration threshold. The detected acceleration and/or deceleration is along more than one axis, and the output values are observed during a period of time including the impact. In step 152, acceleration sensor data are identified based on the output values of at least one acceleration sensor. In step 154, the acceleration sensor data are provided to a receiver, such as receiver 142, for impact characterization.

Method steps 154-160 are performed by the processor 144 of the portable electronic device 140. In step 154, the acceleration sensor data identified in step 152 is received. In step 156, the processor determines, based on the received acceleration sensor data, whether the impact force is associated with an impact force magnitude that is within a predetermined head injury range of magnitude. In an embodiment, step 156 comprises determining whether the received acceleration sensor data is associated with an impact force magnitude that is within a predetermined head injury range of magnitude. In step 160, an impact alert is output, or generated, when the impact force magnitude is within the predetermined head injury range of magnitude.

In an embodiment, the microcontroller 128 transforms the output values, which are representative of a physical action of an impact, into acceleration sensor data. In an embodiment, the processor 144 transforms the acceleration sensor data into an impact alert, both of which are representative of the physical action of the impact. In an example embodiment, such transformations rely on real-time, or near real-time, signal transformation and could not, as a practical matter, be performed entirely in a human's mind.

In an embodiment, the impact sensor 122, including the microcontroller 128, is a particular machine that is specifically devised and adapted to carry out the method of FIG. 2, or variants thereof as described herein. In an example embodiment, component values for the at least one acceleration sensor 124 are specifically chosen to trigger at a particular impact value, which is of interest for a specific application, such as in hockey. In an embodiment, the microcontroller 128 includes firmware specifically adapted to carry out the transformations for properly generating an impact alert.

Notification of Impact Magnitude

In an embodiment, the impact sensor 122 is used to detect impact conditions that may be a concern with respect to possible injury or concussion, and to provide an associated alert. The processor 144 outputs an impact alert 148 based on impact characteristics associated with the received acceleration sensor data 130. In an embodiment, the impact notification application 146 includes logic for outputting an impact alert 148 when a selected acceleration sensor described by the acceleration sensor data 130 is associated with a known head injury range of magnitude. In an embodiment, the impact notification application 146 matches the acceleration sensor to a known range of head form peak G acceleration and/or deceleration.

The impact characteristics can be measured or determined in relation to an impact magnitude. In an embodiment, the impact alert 148 is generated based on the impact characteristics being associated with within a known head injury magnitude range. In an example embodiment, the head injury magnitude range is measured with respect to any one or more of the following: maximum acceleration and/or deceleration in G; peak acceleration and/or deceleration in G; max peak acceleration and/or deceleration in G; head acceleration and/or deceleration criteria (HIC); or SI (severity index). Detected or calculated impact values can be mapped to any of these units of measurement.

For example, in an embodiment, details of the impact alert 148 comprise an indication of impact severity, for example by indicating or displaying an impact severity category. In an embodiment, the impact severity category is conveyed or displayed using text, or by a colour coded alert, with certain impact magnitudes being associated with colours, for example: green, yellow, red and orange. The impact notification application 146 running on the processor 144 receives the acceleration sensor data 130 and determines the range into which the duration data should be placed. In an embodiment, the application layer of the impact notification application 146 creates an alert 148 with an appropriate colour code graphic alert.

In an example embodiment, the processor 144 determines, or calculates, a range or value of the magnitude of the impact force based on the calculated acceleration sensor data 130. In an embodiment, the processor 158 determines the level of acceleration and/or deceleration on a given axis based on the amount of time a switch is open for. For example, a 0.05 ms open time may correlate to 60 G, and an opening of 0.1 ms for the same switch may correlate to 80 G.

In an example embodiment in which the impact force magnitude comprises a range of magnitude of the impact force, the processor 144 calculates the range of magnitude of the impact force based on the obtained acceleration sensor data 130. In an illustrative example, firmware in the processor recognizes that an impact force of 100-125 G in the y-axis typically has a sensor of 0.5 ms. Accordingly, when a sensor of 0.5 ms is detected or received in relation to a y-axis acceleration sensor, the processor determines that the impact force magnitude is in the range of 100-125 G.

In an example embodiment in which the impact force magnitude comprises a value of the impact force magnitude, the processor 144 calculates the value of the impact force magnitude based on the obtained acceleration sensor data 140. In an illustrative example, firmware in the processor recognizes that an impact force of 132 G in the z-axis typically has a sensor of 0.6 ms. Accordingly, when a sensor of 0.6 ms is detected or received in relation to a z-axis acceleration sensor, the processor determines that the impact force magnitude is about 132 G.

In an embodiment, the processor 144 is configured to detect acceleration sensor values and identify the longest duration opening above said threshold opening duration, and to record the relative start times of activation on each axis. In an embodiment, the microcontroller 128 observes the longest switch open duration rather than the total open duration. In an embodiment, the determination of whether the longest acceleration sensor is associated with at least one known head injury threshold is based on rules created based on the laboratory test results, or is based on finding a best match with data in a stored table correlating known opening duration data with acceleration and/or deceleration data.

Determining Impact Magnitude Based on Test Data or Stored Rules

In an example embodiment, the processor 144 outputs the impact alert 148 in response to a comparison of the received acceleration sensor data 130 with test data. In an embodiment, the comparison is performed by the processor 144. In another embodiment, the comparison is performed by a set of logic gates configured based on rules or equations describing determined relationships, and the result of the comparison is provided to the processor 144.

In an embodiment, the test data comprises acceleration sensor durations associated with known impact characteristics. While an example will be described in relation to a protective headpiece, in other embodiments similar test data is gathered in relation to other types of protective headpieces.

In an example embodiment, a first set of test values in the test data is associated with an acceleration and/or deceleration of 120 G in the x axis, with the association being based on testing in which the impact sensor 122 is mounted in a protective headpiece. The headpiece is placed on a head form and subjected to impacts having known characteristics, such as a known magnitude in each axis. acceleration sensor output values collected during the testing, and optionally associated acceleration sensor data, are correlated with measured impact forces in G, which can be measured by an accelerometer used in a test environment. In an illustrative example, a 0.05 ms sensor in the X axis correlates, about 90% of the time, to a head form impact of about 110 G.

An impact sensor 122 according to an embodiment of the present disclosure correlates acceleration sensor with head/headpiece impact data. Each acceleration sensor, or sensor, has different response data over time, with a number of instances of opening and closing, for example with 0 being closed and 1 being open during a particular measured time. The output includes the opening and closing of the sensor elements, with some jitter and secondary impacts.

Though accelerometers can be useful if there is a need to analyze the entire impact curve, there is significant cost and processing required to gather all of the data, much of which is unnecessary for impact alerts or notifications. In contrast, according to embodiments of the present disclosure, a simple low cost device is provided instead of an accelerometer, that will reliably activate at or above a certain acceleration and/or deceleration value for each acceleration sensor. Through testing, the acceleration and/or deceleration value on the headpiece that correlates to an acceleration and/or deceleration value on the head can be determined, with the two values being different, partly because the different mass of the headpiece and the head. Also, when the headpiece has impact padding, at a certain time the head is compressing against the padding.

Laboratory testing of side-by-side acceleration sensor and accelerometer arrangements has revealed relationships between the acceleration sensor and the corresponding acceleration and/or deceleration force at the headpiece, as well as the corresponding acceleration and/or deceleration at the head.

For example, suppose an acceleration sensor of A is associated with a headpiece acceleration and/or deceleration of B, which produces a head acceleration and/or deceleration of C. If the value of C is in a known head injury threshold range or threshold D, the acceleration sensor A is associated with a protective headpiece impact of interest. An impact alert 148 is then output or generated whenever an acceleration sensor of A is measured or received.

Based on the laboratory testing, suitable acceleration sensor values are selected to detect desired acceleration and/or deceleration values using prescribed acceleration and/or deceleration thresholds. The prescribed acceleration and/or deceleration threshold values, or set-off values, of the acceleration sensor may vary depending on parameters such as the age/weight of the wearer, size of the headpiece, temperature, etc.

At times t1 and t2 there is a relationship between the headpiece acceleration and/or deceleration and the head acceleration and/or deceleration, that can be represented by a correlation factor. Elaborate testing has resulted in a library of data correlating acceleration sensor data with headpiece acceleration and/or deceleration and head acceleration and/or deceleration. The concussive range of 90-135 G, which is discussed in the literature and mainly from the NFL football world, is of particular interest and is extensively characterized in the library of data. This 90-135 G injurious range is with respect to head impact, not headpiece impact.

Based on a stored data library with respect to which received impact data can be interpreted, the processor 144 determines the impact magnitude represented by the received impact data in the different axes. In an embodiment, such a library of data is used in order to be able to properly account for variations.

Some of the example variations include: temperature (hot, cold, ambient); headpiece material (foam, vinyl nitrol, expanded polypropylene (EPP), custom material); headpiece size (small, medium, large extra large-since the mass of the headpiece affects the calculation); relative size/weight of player compared to average (small, medium, large, extra large); different angles (off-axis, on axis). In an embodiment, all of these variables and their associated test data are stored in a large database comprising timing signals, based on the output of the at least one acceleration sensor 124 observed by the microcontroller 128. In an embodiment, the processor 144 analyzes the stored values and performs pattern recognition to match the set of measured impact data to the closest set of stored impact data, to determine the nature and characteristics of the impact.

In an embodiment, over time, as the data library is built up, statements and instructions stored in the processor 144 are tweaked to translate the series of 0s and 1s, or the acceleration and/or deceleration sensor opening data 130, to cross-check it against the data library. The processor 144 can then determine the closest match to a set of data in the library.

In another embodiment, a set of impact characterization rules is created based on the contents of the data library. These rules can then be stored in the processor 144 and used to characterize impact without having to communicate with the data library and make comparisons with the data stored therein. In an example embodiment, the set of impact characterization rules is stored as software procedures, or statements and instructions for execution by the processor 144. In another example embodiment, the impact characterization rules are implemented in hardware, or in firmware.

In an embodiment, the processor 144 determines an association between the sensor data 130 and a corresponding acceleration and/or deceleration value or range.

In some instances, head form acceleration and/or decelerations of 60-100 G can all have an associated sensor of about 0.05 ms for example. Similarly, measured acceleration and/or decelerations of 100-120 G can yield a duration of about 0.1 ms. Also, in some impacts, it is difficult to distinguish a 60 G impact from a 180 G impact since the opening durations can look very similar. Therefore, in an example embodiment, the processor 144 acknowledges that an impact above a base threshold is correlated to some value in the entire range (for example, 60-180 G), and a general alert covering a range can be generated.

In another example embodiment, the processor 144 takes all of the received data and compares it to the stored data. The processor can determine, based on the stored data, that if a certain time signal is observed in hot conditions and with an extra large player, that correlates to 321 G in a particular direction, which equals 107 G in the head. The processor 144 converts the data from a timing signal, refers back to the data library to determine what the corresponding headpiece impact value, and compares it again against what it sees in the head form. The processor translates from a timing signal, back to a data library, looking at what it is, and then compares it again against what it sees in the head form response.

In an example test environment, each impact creates about 90,000 data points according to an embodiment of the present disclosure. Performing 100 such tests would create about 9 million data points. For example, for each of z, y and x switches, the following are measured: activation in voltage; acceleration and/or deceleration in G; and time. In an example, the acceleration sensor response is tested by creating an impact at set head form peak G acceleration and/or decelerations (for example, 60, 80, 100, 120, 140, and 180 G) and recording the associated sensor in each case. The trace of the accelerometer is used as a baseline comparison for testing. Head form testing provides an avenue for measuring the acceleration and/or deceleration force in G. In an example embodiment, the head form is a magnesium head form in which an accelerometer is placed. During testing, a 70 G impact on the head and 300 G impact on the accelerometer can be correlated to the corresponding acceleration sensor data.

The testing was also performed sufficient times for similar data inputs in order to determine whether a repeatable sensor can be obtained for the same impact. In an embodiment, the data library comprises data for each different variable and criteria with sufficient tests for an acceptable statistical analysis. Embodiments of the present disclosure are interested in the acceleration and/or deceleration on the sensor or acceleration sensor and how that correlates with the acceleration and/or deceleration on the head form. The accelerometer is only used as a reference in prototype development and for testing. The accelerometer is not a component of an impact sensor according to an embodiment of the present disclosure, which instead includes the at least one acceleration sensor 124.

Primary and Secondary Impact Alerts and Notifications

Figure 3:
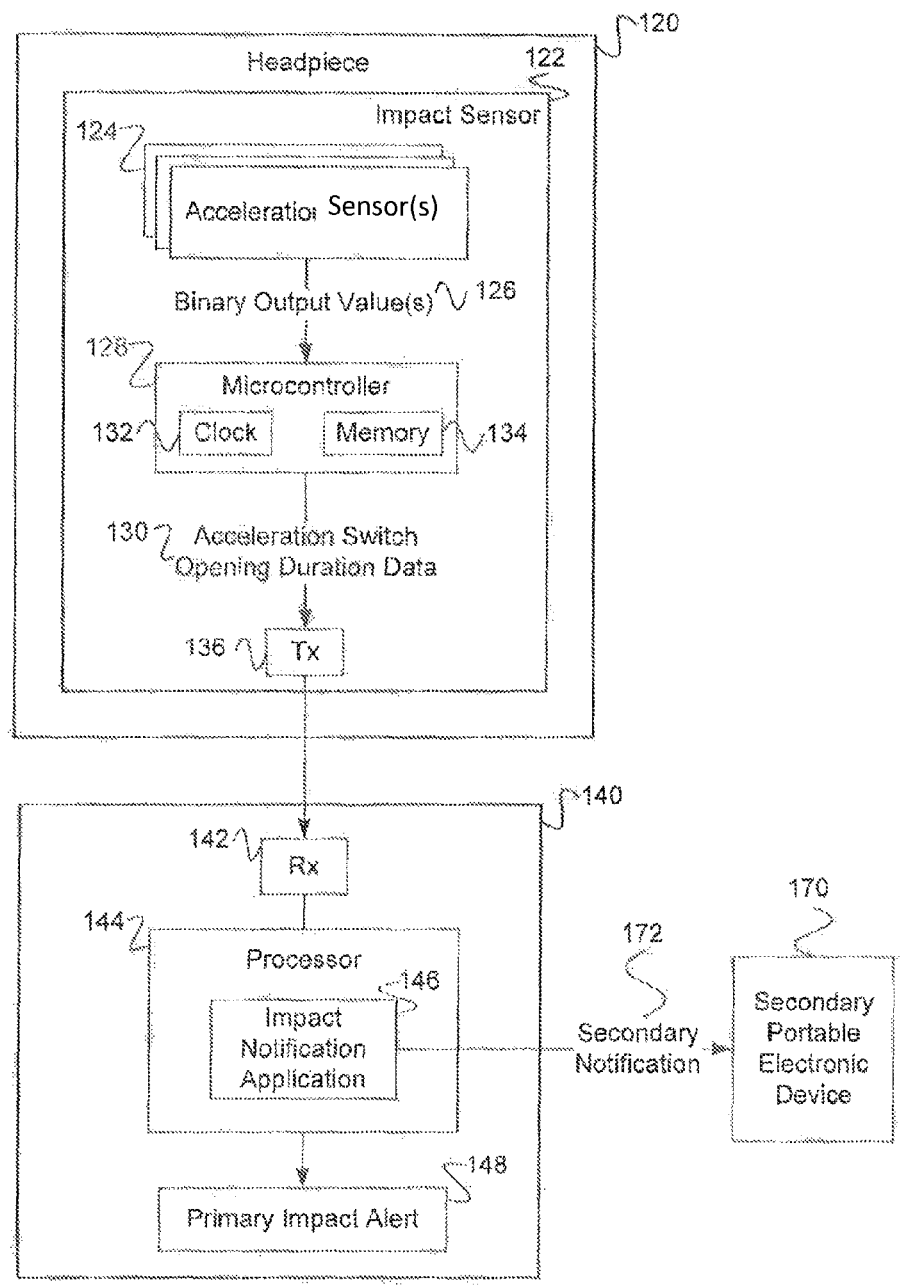
FIG. 3 is a block diagram of an example system for characterizing impact at a protective headpiece including a secondary impact notification.

FIG. 3 is a block diagram of an example of a system for characterizing impact in accordance with an example embodiment including a secondary notification.

Consider an example implementation in which each player on a sports team is outfitted with a protective headpiece 120 including an impact sensor 122 as illustrated in FIG. 1 or FIG. 3. Employing a method of an embodiment of the present disclosure, a coach or trainer having a remote portable electronic device 140, such as a tablet computer or smart phone, can receive an impact alert relating to any of the players. The impact alert 148 can be described as a primary impact alert.

The impact notification application 146 running on the processor 144 can also be configured to communicate with a secondary portable electronic device 170. For example, the secondary device 170 can belong to, or be associated with, a parent or guardian of a player wearing a selected, or particular, impact sensor 122.

In an embodiment, the processor 144 is configured to initiate generation of, or to send, a secondary notification 172 to the secondary portable electronic device 170. The secondary portable electronic device 170 need not be paired or associated with the wireless transmitter 136. In an example embodiment, the impact notification application 146 stores one or more communication identifiers, such as a mobile phone number or an email address, associated with a selected impact sensor 122 for which identifying information, such as a MAC address or serial number, is stored.

In an embodiment, the impact notification application 146 stores the communication identifier, which can be input by a user. In an example embodiment, the application 146 provides the stored communication identifier as an input to a communication application native to the electronic device 140, such as a phone dialer or a messaging application. The user of the device 140 can then confirm, using the native communication application, whether to send the secondary notification to the secondary portable electronic device 170. In another embodiment, the impact notification application 146 includes an option of to selectively permit only an impact notification, or in some cases a detailed impact message, to be sent as the secondary notification 172, based on the severity of the impact, the relationship of the person being contacted, or any other factor.

Notifications from the Impact Notification Application

In an illustrative example embodiment, described below in relation to FIGS. 4A-4G, the mobile phone number of a parent or guardian of a player named Scott Clark is stored via the impact notification application 146. In an embodiment, the application 146 provides an option to send a secondary notification 172 in response to a received impact alert from the selected impact sensor 122 in the protective headpiece 120 worn by Scott Clark. In another embodiment, the impact notification application 146 controls the portable electronic device 140 to automatically send an external notification 172 to the secondary portable electronic device 170, using the stored communication identifier, when a received impact alert meets or exceeds a threshold severity level, or other stored criteria.

FIGS. 4A-4G illustrate screenshots of visual impact alerts on a display of a portable electronic device 140, with elements of the screenshots being generated by an impact notification application 146 according to an example embodiment. Variations in visual placement and textual and graphical details are within the scope of the present disclosure.

FIG. 4A illustrates a basic home page or alert screen 180 of the application 146. This display can include an impact alert 148 as described earlier. In the embodiment of FIG. 4A, the impact alert comprises a general impact notification 182. In an embodiment, the impact alert is configured to override any open programs such as email, text, browser etc., such that it appears "above" or "in front of" such running or open programs. In an example embodiment, the impact alert, or general impact notification 182, is overlaid on a display in front of a running application, in the absence of the rest of the alert screen 180. The impact notification 182, when selected, opens a further screen 184 with additional details, as shown in FIG. 4B.

The general impact alert notification 182 in FIG. 4A is even more generic than previously described impact notifications, since it simply indicates that any one of the impact sensors 122 paired with the device 140, or in relation to which the application 146 is configured to receive data, has experienced impact. This general impact notification 182 can also be referred to as a team notification, group notification, or system level notification, since it alerts to the existence of an impact, without specifying the individual sensor involved or providing any other impact details.

The screen 184 in FIG. 4B features a home logo 186, which can be any image, text, or combination thereof. In an embodiment, when the home logo 186 is selected, the application 146 returns the user to the home/alert screen 180 directly without having to use a back arrow function or other navigation. In FIG. 4B, an orange impact alert button 188 is displayed next to player Scott Clark's name. The name can be abbreviated or modified as in FIG. 4B to save screen real estate. The impact notification 188 is an impact sensor-specific notification, and can be referred to as a player notification or individual notification. The severity or magnitude of the impact can be conveyed using different display colours associated with impact ranges of magnitude.

The screen 184 also displays an impact alert status for other players, beside their names, with a green indication meaning no impact alert, or no impact above a predetermined threshold. Selecting the displayed impact button 188 for S Clark will open a screen 190 shown in FIG. 4C, which illustrates impact details 192 such as the time and date of the impact, and the location of the impact. The displayed details 192 are an example of a detailed impact message, as described earlier, and can include more or fewer details than the example in FIG. 4C. In an alternative embodiment, the displayed details 192, or the impact notification 188, or both, can be provided on the alert screen 180 instead of the general impact notification 182.

Figure 4C:
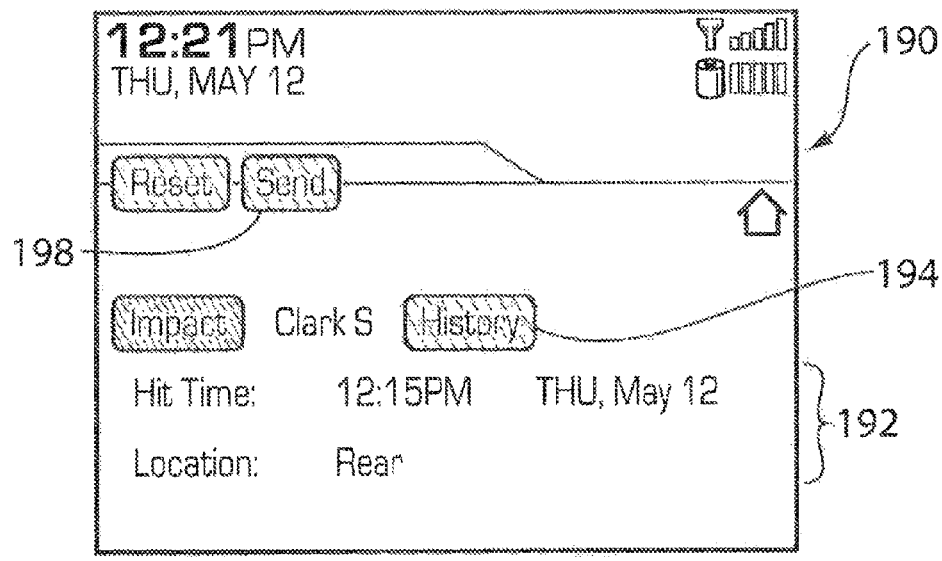
Figure 4D:
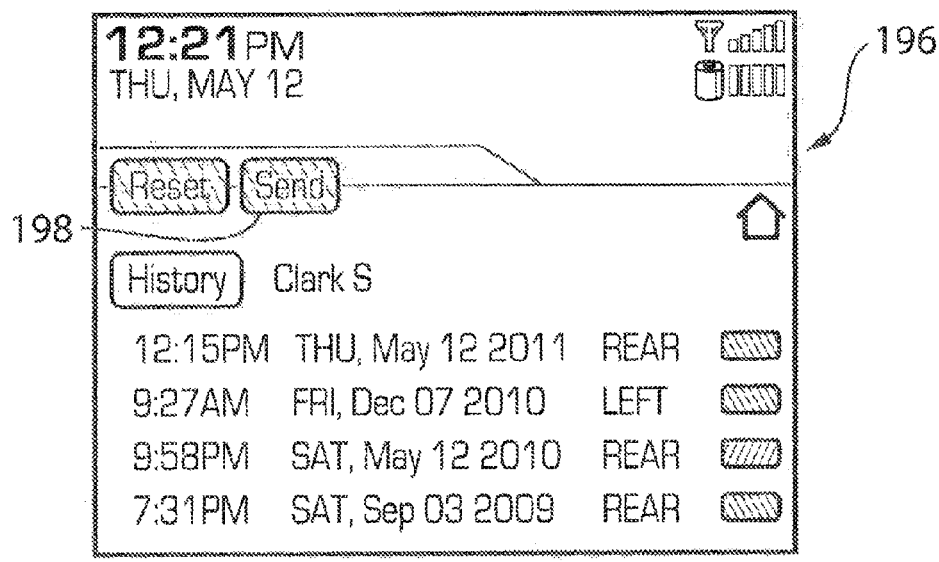
Figure 4E:
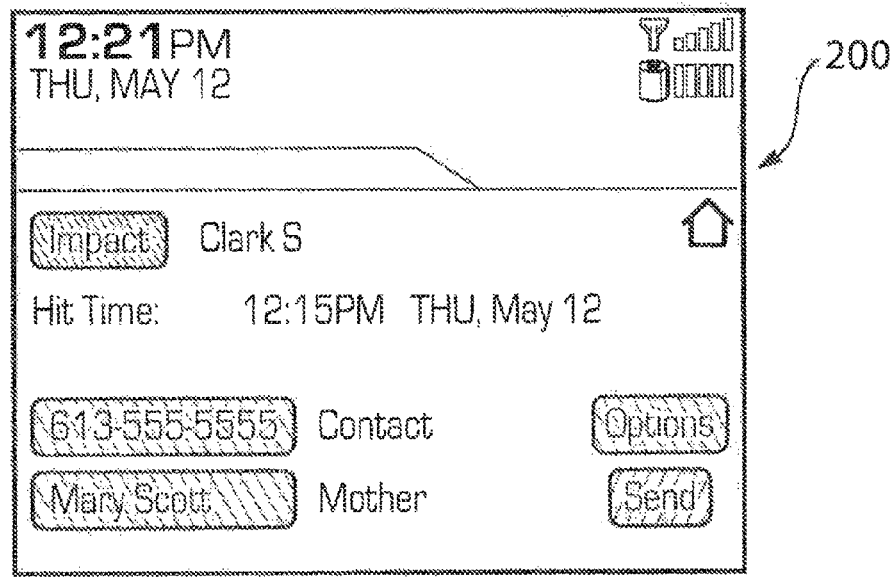

A History button 194 is provided which, when selected, opens the screen 196 of FIG. 4D, which illustrates an impact history for Scott Clark. The impact history screen 196 indicates a history of impacts for Scott Clark, including data and time, location of impact, and indication of severity such as using colour codes. In other embodiments, more detailed information or less detailed information can be provided in this screen 196.

Selecting the Send button 198 in FIG. 4C or 4D opens a send communication screen 200. In the send communication screen 200, or in another setup screen or menu, a user can select options and set up the contact details for the player/sensor (for example, SMS or email) with name, mobile telephone number, email address and selectable send method (SMS or Email). In an embodiment, this screen 200 acts as an interface to provide the displayed information to a phone dialer or messaging application native to the device 140, such that the native application performs the actual sending.

Figure 4F:
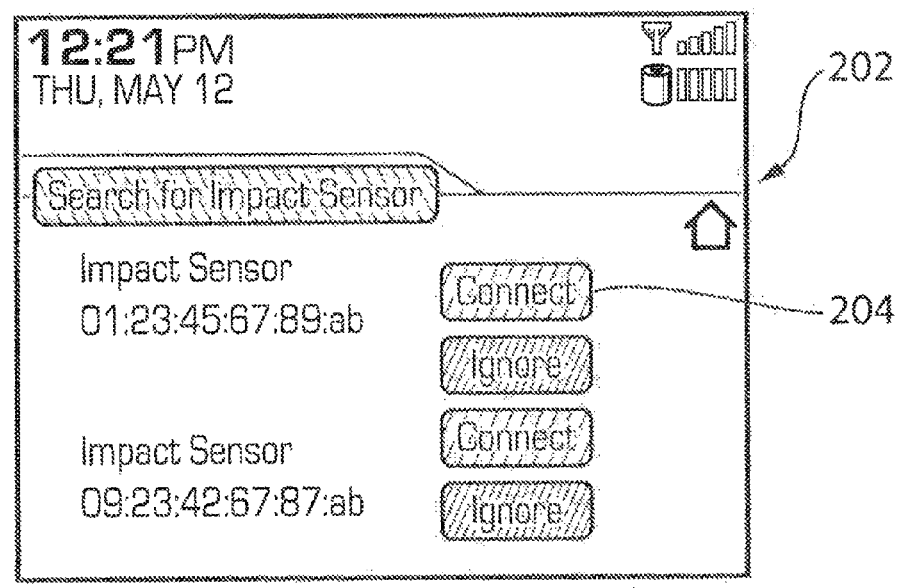
Figure 4G:
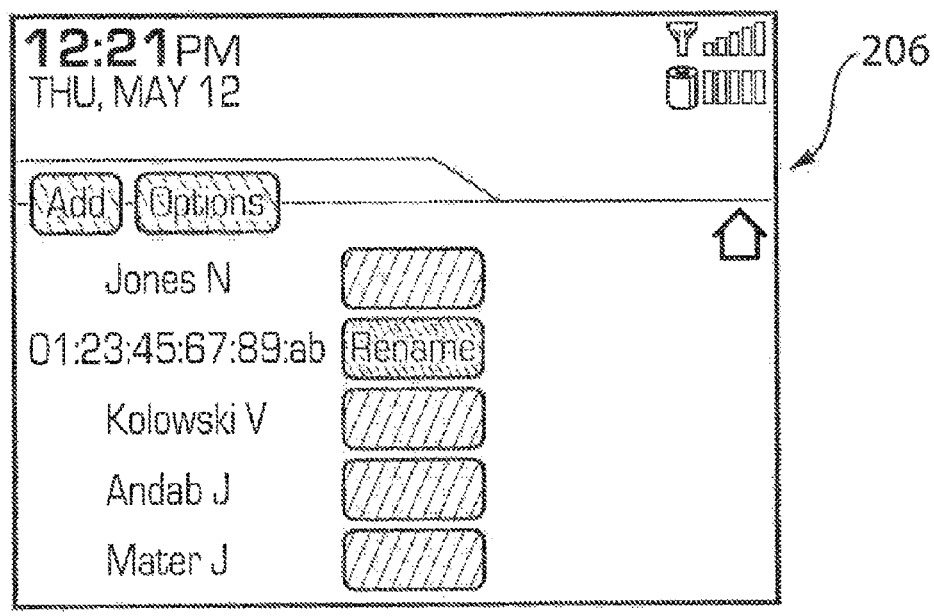

Selecting the Add button in FIG. 4B opens a screen 202 shown in FIG. 4F, which enables the pairing of a portable electronic device 140 to a selected sensor 122. Selecting the top green connect button 204 in relation to the selected sensor 122 will open the associated screen 206 of FIG. 4G, in which the user can overwrite the sensor MAC address with the player name, or any other desired character string.

The screenshots of FIGS. 4A-4G are representative of a graphical user interface for use with an impact notification application 146 according to embodiments of the present disclosure. In an example embodiment, the impact notification application 146 includes one or more of the following features: impact magnitude algorithm; impact direction algorithm; alert function/display; pairing sensor to device (add a sensor); set up guide during pairing (for example, graphical); over write MAC address with player name; insert player skill level (for example, in a drop down list); set up impact notification settings, such as notified person name/title, email/cell phone, send individual event or complete history; view impact event (per player/sensor); view impact history per player/sensor; view individual impact events within history to edit/modify outcome, such as impact diagnosed as concussion Yes/No, or diagnosis method (for example, in a drop down list); clear impact alert (maintains event in history log) icon; begin SCAT2 concussion diagnosis (starts SCAT2 tool); download individual player/all player impact history to secondary device via Bluetooth or other near field communication technology; help function; previously paired devices automatically pair/connect when detected; alert generated when sensor request signal received but no data packet transmitted from sensor; or software updates pushed to device via app store (for example, using 3G or wireless connection).

Bluetooth Example Embodiment

An example embodiment of the system illustrated in FIG. 5 using Bluetooth as the wireless communication protocol will now be discussed in greater detail. In an embodiment, the wireless transmitter 136 is a Class 1 Bluetooth module, which is pre-FCC approved. In an example embodiment, the impact sensor 122 comprises a Lithium Ion custom flat foil cell as a power supply. While a Class 1 Bluetooth module is described, other near field communication technologies may be employed, Consider an example implementation in which each player on a team has a protective headpiece 120 including an impact sensor 122 comprising five acceleration sensor 124. The microcontroller 128 receives all five output values 126 from the acceleration sensor es and identifies and sends the associated acceleration sensor data 120 via the wireless transmitter 170 as a packet of data to the portable electronic device 140. The data 130 is received by the wireless receiver 142. The impact notification application 146 running on the processor 144 interprets the received acceleration sensor data 130, and indicates which player has experienced an impact. In an embodiment, such an indication is provided in response to that player's impact sensor 122 meeting the prescribed acceleration and/or deceleration threshold on at least one axis. The microcontroller 128 and the wireless transmitter 136 cooperate to packetize the acceleration sensor data 130, and send the packet(s) using Bluetooth communication.

Class 1 Bluetooth has a range of about 100 m, while most handsets are Class 2 Bluetooth, which has a range of about 10 m. In an example embodiment, the portable electronic device 140 is configured to pair with the Bluetooth device 136 of the impact sensor of each of the players. For a sports team, each player has an individual identifier, which can be based on a MAC address or other serial number on the impact sensor 122 during the pairing mode. In an embodiment, the MAC address is overwritten on the GUI on the portable electronic device 140 with the player's number/name.

Currently, the Bluetooth standard allows for up to 7 active devices at once. In an embodiment, the processor 144 "parks" or reserves the MAC addresses for all of the team members, after pairing. When one of the impact sensors 122 is activated, the wireless transmitter 136 sends a requester signal 208, or request ID, via Class 1. The portable electronic device 140, via the wireless receiver 142, receives, detects and identifies the requester signal 208 and generates an impact notification.

The portable electronic device 172 (Class 2 device) sends an acknowledgement 210, but since it is class 2, it is most likely out of range from the wireless transmitter 136. When the player with the activated impact sensor 122 comes back within range of the portable electronic device 140, for example back to the bench, the wireless transmitter 136 receives the acknowledgement signal 210 from the wireless receiver 142, sends the packet of data to the portable electronic device 140, and completes the transaction.

Therefore, in an example embodiment, an impact notification is generated by the processor 144 and application 146 in response to the requester signal 208, regardless of whether any acceleration sensor data 130 has been received. In this embodiment, further impact details are not displayed until the player with the activated impact sensor 122 becomes within range of the wireless receiver 142 of the portable electronic device 140. At that point, a detailed impact message can be generated, as described above in relation to FIG. 3.

In an embodiment, the impact sensor 122 continues to send its requester signal, or request ID, 208 until the wireless transmitter 136 is within range of the wireless receiver 142. In another embodiment, the portable electronic device 140 continues generating acknowledgement signals 210 until it receives the expected packet from the wireless transmitter 136, the packet including acceleration sensor data 130.

The Class 1 requester signal 208, or request, is an example of an impact alert trigger on the basis of which a generic impact notification can be generated. This identifies that an alert has been received from a particular player, even before the complete data is received in order to determine further information. In some instances, it may not be necessary to immediately know the severity of the impact, based on the values of the packet, since that may simply determine whether the impact is due to a rear hit or side hit. It is often desirable to have a timely indication or notification of the existence of an impact before calculating or determining the details of the impact and its severity.

While the wireless communication is described in relation to this example embodiment as using Bluetooth to carry the data as-is, in another embodiment the data is encapsulated using a suitable encapsulation technique, and then sent via Bluetooth. The specific implementation details regarding encapsulation, or encoding/decoding, are known to one of ordinary skill in the art. Also, in an embodiment, the impact notification application 146 downloads new libraries over time, to obtain more current and complete patterns.

Acceleration Sensor Output Based Impact Alert on Sensor

In some cases, it can be beneficial to provide an alert indicator at the impact sensor 122, instead of or in addition to the transmitted signals.

Figure 6:
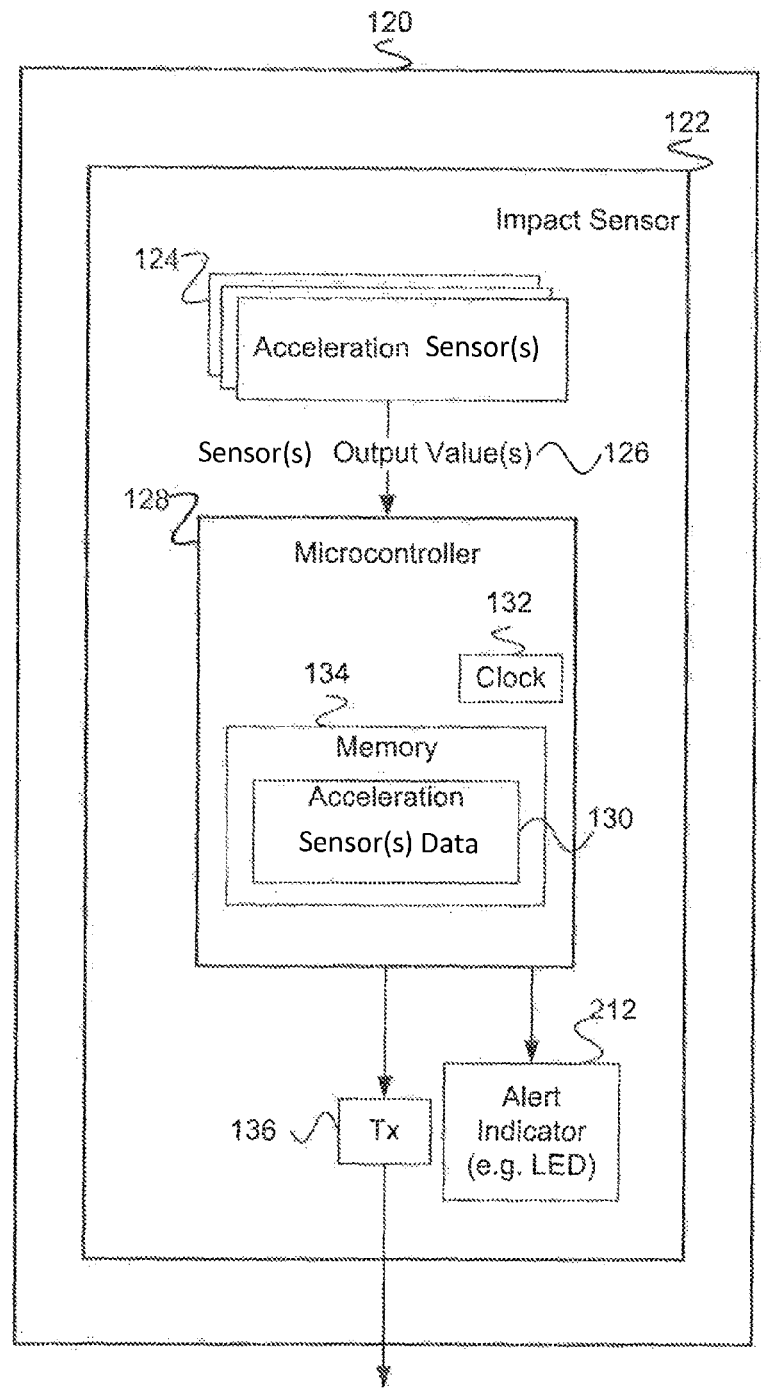
FIG. 6 is a block diagram of an example system for characterizing impact at a protective headpiece.

In the example embodiment shown in FIG. 6, the microcontroller 128 includes firmware configured to output an impact alert by activating an alert indicator 212 based on impact characteristics associated with the acceleration sensor data 130, for example based on the longest duration of opening above a set value in each axis.

In an example embodiment, the microcontroller 128 triggers an alert indicator 212. The alert indicator 212 can be provided on or at the protective headpiece 120, for example as part of the impact sensor 122. The alert indicator 212 provides an impact notification that can be sensed by any one or more of the five human senses. In an example embodiment, the alert indicator 212 is a device that provides a visual indication, such as a change in illumination or a change in color. In an example, the alert indicator 212 comprises an LED. In another example embodiment, the alert indicator 212 is a speaker or other audio device capable of emitting an audible alarm.

An impact sensor 122 according to the embodiment of FIG. 6 generates an impact indication on the alert indicator 212 when any acceleration sensor exceeds a stored threshold, for example about 1 millisecond, or about 0.25 milliseconds. If a child takes a hit to the head, one or more of the acceleration sensor 124 activates, and the microcontroller 128 determines if the acceleration sensor exceeds a stored threshold, if the activation occurs in the right space of time. For example, in an embodiment, an activation below a minimum activation threshold, for example about 0.01 milliseconds, is ignored as not being relevant. If the acceleration sensor exceeds the stored threshold for opening duration, the microcontroller activates the alert indicator 212. This can provide a visual indication to take the child off the ice, to know when to start concussion management procedures.

Figure 5:
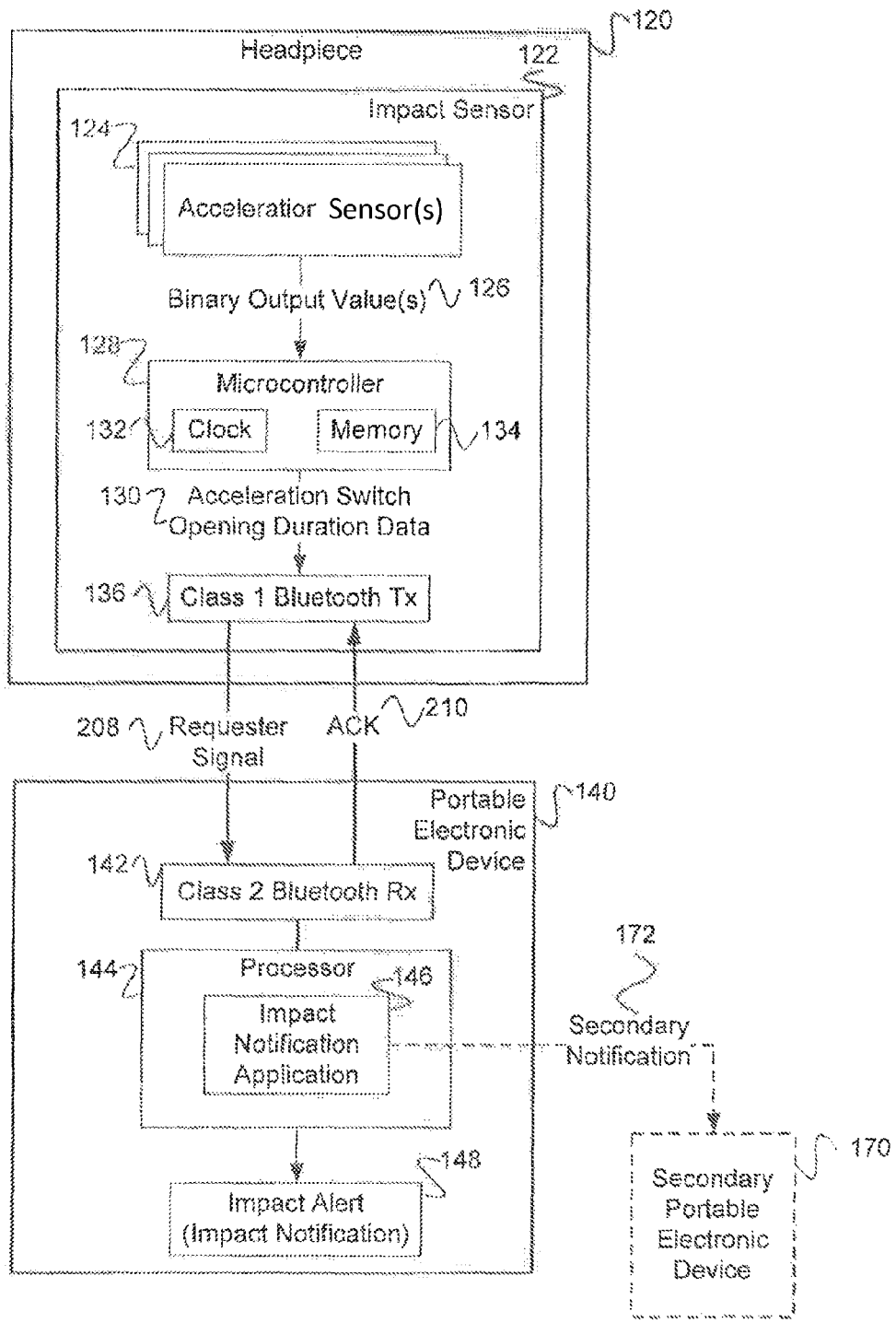
FIG. 5 is a block diagram of an example system for characterizing impact at a protective headpiece using Bluetooth communication or other near field communication technology.

In the example embodiment of FIG. 5, the impact sensor 122 includes the transmitter 136 and the alert indicator 212. In such an example embodiment, the impact sensor 122 is configured to provide an impact notification at the sensor itself, as well as to transmit the acceleration sensor data 130 to a portable electronic device 140 in order to provide alert details.

In another embodiment, the impact sensor 122 of FIG. 5 includes the alert indicator 212, without the transmitter 136, providing a stand-alone impact sensor configured to alert to impact based on acceleration sensor data. In such an embodiment, in contrast to the example embodiment of FIG. 1, the impact sensor 122 can comprise a small coin cell power supply, such as a CR 2032 battery, as the power supply.

An impact sensor 122 according to an embodiment of the present disclosure can be beneficial in any type of protective headpiece, whether or not the protective headpiece is intended for protective purposes.

Examples of protective headpieces, such as protective headpieces, include, but are not limited to: protective helmets used by firefighters and other emergency service workers, construction workers, tradesmen, professional and amateur athletes, and children participating in sports and recreational activities; bicycle helmets; motorcycle helmets; rock climbing helmets; military helmets; football helmets; hockey helmets; lacrosse helmets; ski helmets; cricket helmets; baseball helmets; protective hart hats; mixed martial arts helmets; welding helmets; etc.

Examples of protective headpieces not intended for impact protection, but in relation to which an impact sensor according to embodiments of the present disclosure can be used, include but are not limited to: ski hats; snowboard hats; balaclavas; masks; toques; caps; headbands; sweatbands; sun hats; visors; goggles, etc.

While embodiments have been described herein with respect to a protective headpiece, it is to be understood that such embodiments can be incorporated into any type of personal protective equipment, including clothing, helmets, goggles or other garment or equipment designed to protect any portion of the wearer's body from injury.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

While any of the modules described herein may be embodied as computer-readable instructions executed by a processor, any of the modules may be embodied in hardware (e.g., an application specific integrated circuit (ASIC), an electrical circuit included a plurality of electrically interconnected discrete components, a logic circuit, etc.). Alternatively, or additionally, any of the modules described herein may be embodied in a combination of hardware and software (e.g., a field programmable gate array, a special purpose processor, a programmable sensor, etc.).

The above-described embodiments are intended to be examples only. Alterations, modifications and variations can be effected to the particular embodiments by those of skill in the art without departing from the scope, which is defined solely by the claims appended hereto.

What is claimed is:

1. A method of automatically characterizing protective headpiece impact, comprising:
    receiving acceleration sensor data based on output values from at least one acceleration sensor, the at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis, the output values observed during a period of time including the impact;
    determining, based on the received acceleration sensor data, whether the impact force is associated with an impact force magnitude that is greater than a predetermined head injury threshold; and
    outputting an impact alert when the impact force magnitude is determined to be greater than the predetermined head injury threshold, wherein the predetermined head injury threshold is adjustable between a practice setting and a game setting, and wherein the impact alert is visible to an individual wearing the protective headpiece.

2. The method of claim 1 wherein the acceleration sensor data comprises a plurality of acceleration sensor readings.

3. The method of claim 1 wherein the acceleration sensor data comprises a highest acceleration sensor output value observed during the period of time including the impact.

4. The method of claim 3 further comprising determining a direction of the impact by identifying an axis on which the highest acceleration sensor output is observed.

5. The method of claim 1 wherein the acceleration sensor data comprises a number of activations of the at least one acceleration sensor observed during the period of time including the impact.

6. The method of claim 1 further comprising calculating a value of the impact force magnitude based on the received acceleration sensor data.

7. The method of claim 1 further comprising calculating a range of magnitude of the impact force based on the received acceleration sensor data.

8. The method of claim 7 further comprising providing an indication of the calculated range of magnitude of the impact force based on stored magnitude range category thresholds.

9. The method of claim 8 further comprising providing a visual indication identifying an impact severity associated with the calculated range of magnitude of the impact force.

10. The method of claim 8 wherein the visual indication includes a personal identifier identifying a person associated with an impact sensor at which the impact force is measured.

11. The method of claim 1 further comprising providing an impact notification in response to receiving a requester signal, and before a complete packet of acceleration sensor data is received, the impact notification indicating generally that the impact exceeds a prescribed threshold independent of the impact force magnitude.

12. The method of claim 1 wherein determining whether the impact force is associated with an impact force magnitude that is within a predetermined head injury range of magnitude is based on stored rules associating acceleration sensor data with impact force magnitudes.

13. The method of claim 1 wherein determining whether the impact force is associated with an impact force magnitude that is within a predetermined head injury range of magnitude comprises:
    determining whether the acceleration sensor data is between a minimum and maximum acceleration sensor associated with a predetermined head injury range of magnitude.

14. The method of claim 1 wherein determining whether the impact force is associated with an impact force magnitude that is within a predetermined head injury range of magnitude comprises:
    comparing the acceleration sensor data to test data to identify a best match within the test data; and
    correlating the best match with stored head acceleration and/or deceleration impact data, and outputting the impact alert when the correlated head acceleration and/or deceleration impact data is within a predetermined head injury range of magnitude.

15. A system of characterizing a protective headpiece impact, comprising:
    an acceleration sensor data receiving module stored on a memory that, when executed by a processor, causes the processor to receive acceleration sensor data based on output values from at least one acceleration sensor, the at least one acceleration sensor positioned on the protective headpiece to detect acceleration and/or deceleration of the protective headpiece due to an impact force that exceeds a prescribed acceleration and/or deceleration threshold, the detected acceleration and/or deceleration being along more than one axis, the output values observed during a period of time including the impact;
    an impact force determination module stored on a memory that, when executed by a processor, causes the processor to determine, based on the received acceleration sensor data, whether the impact force is associated with an impact force magnitude that is greater than a predetermined head injury threshold; and
    an impact force output module stored on a memory that, when executed by a processor, causes the processor to output an impact alert when the impact force magnitude is determined to be greater than the predetermined head injury threshold, wherein the impact alert is physically attached to the protective headpiece and is visible to an individual wearing the protective headpiece.

16. The system of claim 15, wherein the predetermined head injury range threshold is adjustable between a practice setting and a game setting.

17. The system of claim 15, wherein the impact alert is output when a selected received acceleration sensor described by the acceleration sensor data is associated with an impact force magnitude that falls within a known head injury range of magnitude.

18. A non-transitory computer-readable memory storing computer-readable instructions that, when executed by a processor, cause the processor to characterize a protective headpiece impact, comprising:

an acceleration sensor value obtaining module that, when executed by a processor, causes the processor to obtain output values from at least one acceleration sensor positioned on the protective headpiece to detect acceleration and/or deceleration of the protective headpiece due to an impact force that exceeds a predetermined acceleration and/or deceleration threshold, the detected acceleration and/or deceleration being along more than one axis, the output values obtained during a period of time including the impact;

an acceleration sensor data identification module that, when executed by a processor, causes the processor to identify acceleration sensor data based on the output values of at least one acceleration sensor; and an acceleration sensor data communication module that, when executed by a processor, causes the processor to provide the acceleration sensor data to a receiver for impact characterization, wherein the predetermined acceleration and/or deceleration threshold is adjustable between a practice setting and a game setting.

19. The non-transitory computer-readable memory of claim 18, further comprising;

an alert indicator configured to provide an impact alert when a selected received acceleration sensor data is associated with an impact force magnitude that falls within a known head injury range of magnitude.

20. The non-transitory computer-readable memory of claim 19, wherein the alert indicator is physically attached to the protective headpiece, and is visible to an individual wearing the protective headpiece.

\* \* \* \* \*